(12) United States Patent
Shezaf et al.

(10) Patent No.: US 6,832,009 B1
(45) Date of Patent: Dec. 14, 2004

(54) METHOD AND APPARATUS FOR IMPROVED IMAGE INTERPOLATION

(75) Inventors: Nira Shezaf, Haifa (IL); Hagit Abramov-Segal, Binyamina (IL); Ilan Sutskover, Nesher (IL); Ran Bar-Sella, Haifa (IL)

(73) Assignee: Zoran Corporation, Santa Clara, CA (US)

( * ) Notice: Subject to any disclaimer, the term of this patent is extended or adjusted under 35 U.S.C. 154(b) by 0 days.

(21) Appl. No.: 09/405,714

(22) Filed: Sep. 24, 1999

(51) Int. Cl.[7] .................................................. G06K 9/32
(52) U.S. Cl. ....................................................... 382/300
(58) Field of Search ................................ 382/300, 284, 382/276, 293, 298, 299; 348/240.99, 365, 406.1; 345/606, 608, 609, 610, 611, 617; 358/525, 528

(56) References Cited

U.S. PATENT DOCUMENTS

| | | | | |
|---|---|---|---|---|
| 4,218,703 A | * | 8/1980 | Netravali et al. | 348/416.1 |
| 5,054,100 A | * | 10/1991 | Tai | 382/300 |
| 5,103,306 A | * | 4/1992 | Weiman et al. | 348/400.1 |
| 5,224,208 A | * | 6/1993 | Miller, Jr. et al. | 345/426 |
| 5,373,322 A | * | 12/1994 | Laroche et al. | 348/273 |
| 5,444,493 A | * | 8/1995 | Boie | 348/448 |
| 5,621,467 A | * | 4/1997 | Chien et al. | 348/409 |
| 5,754,710 A | * | 5/1998 | Sekine et al. | 382/300 |
| 6,281,875 B1 | * | 8/2001 | Zhao et al. | 345/136 |
| 6,411,305 B1 | * | 6/2002 | Chui | 345/660 |
| 6,421,084 B1 | * | 7/2002 | Chang et al. | 348/273 |

OTHER PUBLICATIONS

N.A. Dodgson, "Quadratic Interpolation for Image Resampling", IEEE Transaction on Image Processing, vol. 6, No. 9, p. 6, Sep. 1997.

Parker et al. "Comparison of Interpolating Methods for Image Resampling," *IEEE Transactions on Medical Imaging*, vol. MI–2, No. 1, Mar. 1983, pp. 31–39.

Michaud et al., "Fuzzy Detection of Edge–Direction for Video Line Doubling," *IEEE Transaction on Circuits and Systems for Video Technology*, vol. 7, No. 3, Jun. 1997, pp. 539–542.

Ting et al., "Spatially Adaptive Interpolation of Digital Images Using Fuzzy Inference," *Proceedings of the SPIE— The International Society for Optical Engineering*, vol. 2727, pt. 3, pp. 1206–1217, Mar. 1996.

Allebach et al., "Edge–Directed Interpolation," Proc. ICIP–96, *IEEE Press*, Lausanne CH, vol. III, pp. 707–710, 1996.

Biancardi et al., "Improvements to Image Magnification," Image Analysis and Proceeding, 9th International Conference, *ICIAP '97* Proceedings, p. 2 vol. (xxii+722+794), pp. 142–149 vol. 1, 1997.

Thurnhofer et al., "Edge–enhanced image zooming," *Optical Engineering*, vol. 35, No. 7, Jul. 1996, pp. 1862–1869.

\* cited by examiner

*Primary Examiner*—Kanji Patel
(74) *Attorney, Agent, or Firm*—Parsons Hsue & de Runtz LLP

(57) ABSTRACT

A method and apparatus for image interpolation provides a simple method that can up-scale an image in various scale ratios, including fractional scaling ratios, and can yield a sharp image with reduced unpleasant visual artifacts. An embodiment uses a power weight function that is gradient dependent and uses a function that has a linear dependence on the distance to compute interpolated pixels. A further embodiment uses a power that can be adapted according to the local contrast of edges.

35 Claims, 5 Drawing Sheets

(A TYPICAL SITUATION FOR INTERPOLATING THE VALUE OF c)

INTERPOLATING c FROM TWO PIXELS WITH DIFFERENT GRADIENTS
(x-axis = position; y-axis = value)

(a) original image; (b) linear interpolation; (c) Cubic-Spline Interpolation; (d) Interpolation According to the Invention (a) original image; (b) linear interpolation; (c) Cubic-Spline interpolation; (d) Interpolation According to the Invention (a) original image; (b) linear interpolation; (c) Cubic-Spline interpolation; (d) Interpolation According to the Invention

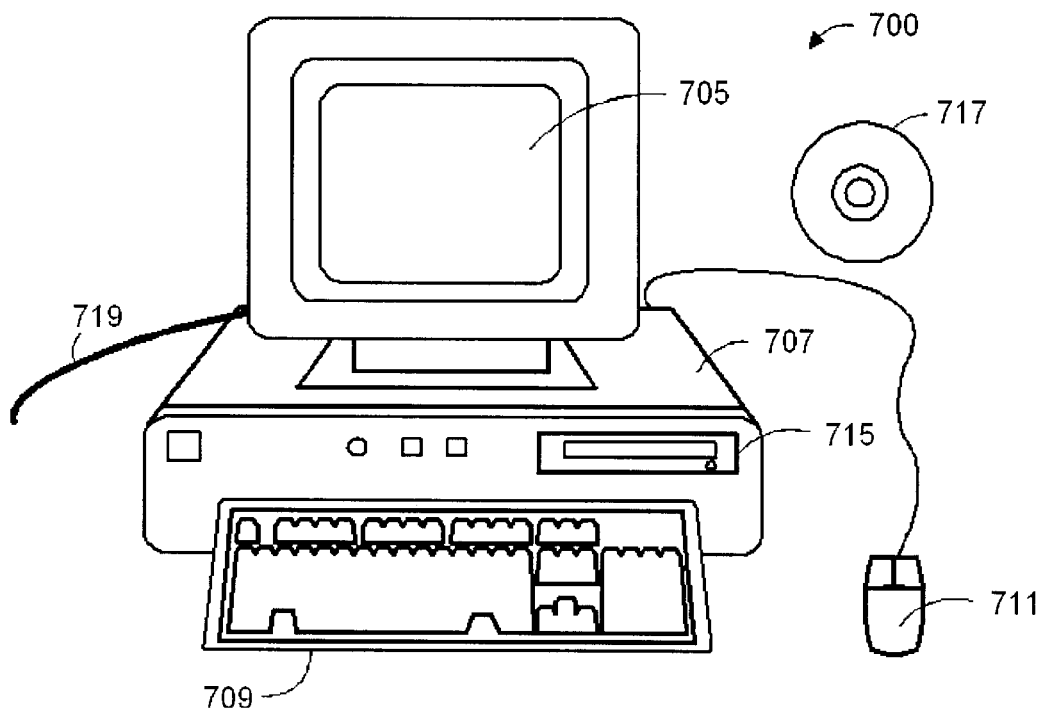
Figure 7
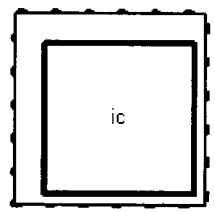
Figure 8
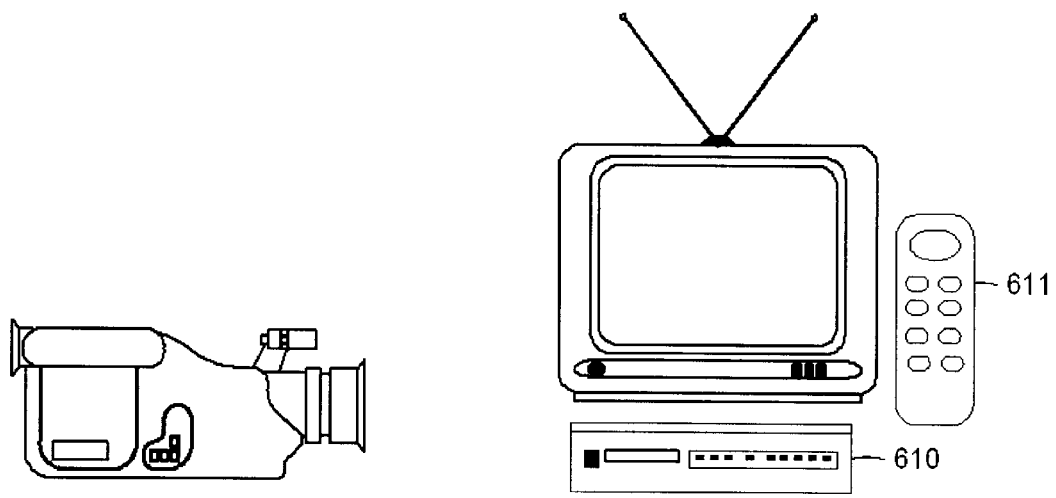
Figure 9        Figure 10

METHOD AND APPARATUS FOR IMPROVED IMAGE INTERPOLATION

FIELD OF THE INVENTION

This invention relates to the field of logic systems. More particularly, the present invention is directed to methods and logic apparatus for image interpolation.

BACKGROUND OF THE INVENTION

Good quality interpolation of digitally encoded images to higher resolution is important in many applications of digital imaging. Such applications include image zooming for digital camera pre-print processing or image zooming in digital video. Image up-scaling interpolation is commonly performed by simple methods such as pixel replication, bilinear interpolation, or spline interpolation [1,2]. The visual results of these interpolation methods suffer from blurring and aliasing affects.

Adaptive interpolation is one method used to achieve better results in image up-scaling. While digital imaging applications require the ability to scale an image to any fractional scaling ratio, most existing adaptive interpolation methods are designed for an integer scaling ratio only. Another typical problem with many advanced interpolation methods is their high computational complexity and high storage complexity.

Adaptive interpolation algorithms have been developed to improve the magnified image quality. Allebach et al. [4] and Biancardi et al. [5] use an interpolation technique that is directed by a high resolution edge-map that was generated from the original low resolution image. Thurnhofer et al. [6] and Michaud et al. [7] used interpolation method that first find the local edge orientation and then interpolate along the edge direction that was found. This method was also being used by Ting et al. [3] for interpolating along sharply curved edges.

A review of interpolation methods was conducted during development of the present invention. A number of papers were reviewed. Reviewed methods include the following approaches:

1. Conventional interpolation methods that use a constant convolution kernel;
2. Adaptive methods that use edge information for the interpolation;
3. Interpolation methods that use Median filters;
4. Interpolation methods that use image transformation like DCT;
5. Interpolation methods that exploit video motion compensation.

Ting. et al. [3] discusses using local gradient properties for interpolating the image. The discussed method consists of two phases. In the first phase, the method interpolates the image using a fuzzy logic system with member functions that are Gaussian-like, depending on calculated gradients of the source image. In its second phase, the method changes values on sharply curved edges due to unsatisfying performance of the first phase along such edges. These values are replaced by linear interpolation along the sharply curved edges detected. The complexity of the edge detection discussed by Ting is high and is not suitable for fractional scaling ratios. The method used by the first phase fails when a fractional scale ratio is needed. Its behavior with a fractional scale ratio is very close to pixel replication, due to the properties of the Gaussian function.

While the first phase of the interpolation algorithm in Ting uses an interpolation formula that is gradient dependent, the formula does not produce consistent satisfactory results and Ting therefore uses a second correction phase that requires much higher complexity.

Paint Shop Pro 5, a very well-known graphics program, uses three methods of resizing: smart size, Bilinear resample, and Bicubic resample. The first method is a special resizing algorithm of Paint Shop Pro and the other two are classical methods. None of these methods yield consistently satisfactory results.

What is needed is a method or apparatus for performing image interpolation that is suitable for lower complexity applications and produces results with a minimum of visual artifacts. What is further needed is a method that can be made adaptive and that can use a non-integer scaling ratio.

Sobel Operator Background

A variety of different operators and functions are known and used in the art to perform various image processing tasks. Specific operators are given herein for the sake of clarity of the description of the invention, however other known or yet to be developed operators and functions may also be used to generate gradients and other values used by the invention.

One important operator is known as the Sobel Operator. In its ideal form, the operator consists of a pair of 3×3 convolution kernel masks, one as shown in (5) and the other rotated by 90°.

These kernels are designed to respond maximally to edges running vertically and horizontally relative to the pixel grid, one kernel for each of the two perpendicular orientations. The kernels can be applied separately to the input image, to produce separate measurements of the gradient component in each orientation (call these Gx and Gy). The components can then be combined to determine an absolute magnitude of the gradient at each point and the orientation of that gradient. The gradient magnitude is given by: $|G|=\operatorname{sqrt}(Gx^2+Gy^2)$. In many applications, an approximate magnitude for the gradient is computed using: $|G|=(|Gx|+|Gy|)/2$, which is much faster to compute.

Often, the absolute magnitude is the only output a user from a Sobel operation—the two components of the gradient are conveniently computed and added in a single pass over the input image using a pseudo-convolution operator as shown below:

| P1 | P2  | P3 |
|----|-----|----|
| P4 | $a_i$ | P6 |
| P7 | P8  | P9 |

Using this kernel, the approximate magnitude can be obtained from: $|Ga_i|=(|(P1+2P2+P3)-(P7+2P8+P9)|+|(P3+2P6+P9)-(P1+2P4+P7)|)/2$.

The angle of orientation of the edge (relative to the pixel grid) giving rise to the spatial gradient is given by: $\theta=\arctan Gy/Gx$. In this case, orientation angle value 0 is taken to mean that the direction of maximum contrast from black to white runs from left to right on the image, and other angles are measured anti-clockwise from this.

A related operator is the Prewitt gradient edge detector. This works in a very similar way to the Sobel operator but uses slightly different kernels. These kernels produce similar results to the Sobel, but the operator is not as isotropic in its response. Another known operator is the Roberts operator.

Image Interpolation

As is known in the art, common applications for pixel interpolation include changing the size of a digital image or changing the resolution of a digital image. In either case, generally the number of pixels in the image will change and the final size of the digital image will be related to the final pixel size. When the number of pixels in an image increases, either due to increasing the size or the resolution of the original image, that is often referred to in the art as upscaling.

It is also known in the art that pixels can be roughly square, as is common for computer displays, or roughly rectangular, as common for television images, and pixels are generally uniform in size and arrangement in an image. Other pixel geometries have been discussed in the art, but these are not commonly used. The interpolation methods discussed herein can be adapted to these alternate geometries.

It is also known in the art that digital images can be encoded in a two-dimensional x, y array with a single value at each location. Single-value encoding is often used for gray-scale images, but may also be used for various compressed color images.

Color images are commonly encoded in a three-dimensional array, with three values at every x, y location. These three values can denote primary color values, such as red, green, and blue (RGB) or cyan, magenta, and yellow (CMY). Three values can also denote luminance and color difference values such as YIQ; or can denote hue, saturation, and luminance value (HSV). It is also known in the art to use a color mosaic pattern (such as the Bayer pattern) to encode a color image in a two-dimensional image plane. Similar encoding can also be used to represent infra-red or x-ray images.

In some image processing systems, image manipulations are accomplished assuming that all of the original pixels are point values, located at the centers of the pixels. Distances to new pixel locations are also determined with reference to point values. More complex image processing tasks may take into account the shape and dimensions of individual pixels when performing image processing functions.

REFERENCES

[1] J. A. Parker, R. V. Kenyon and D. E. Troxel, "Comparison of Interpolating Methods for Image Resampling", IEEE Tran. Med. Imaging, 1983, vol. 2, No. 1, pp. 31–9, March 1983.

[2] N. A. Dodgson, "Quadratic Interpolation for Image Resampling", IEEE Transactions on Image Processing, vol. 6, No. 9, p. 6, September 1997.

[3] H. C. Ting and H. M. Hang, "Spatially adaptive interpolation of digital images using fuzzy inference", Proc. SPIE—Int. Soc. Opt. Eng. (USA), Proceedings of the SPIE—The International Society for Optical Engineering, vol. 2727, pt. 3, pp. 1206–17, March 1996.

[4] J. Allebach and P. W. Wong, "Edge-Directed Interpolation", Proc. ICIP-96, IEEE Press, Lausanne CH, vol. $I$, pp. 707–10, 1996.

[5] Biancardi, L. Lombardi and V. Pacaccio, "Improvements to image magnification", Image Analysis and Proceeding. 9$^{th}$ International Conference, ICIAP '97 Proceedings, p. 2 vol. (xxii+722+794), pp. 142–9 vol. 1, 1997.

[6] S. Thurnhofer and S. K. Mitka, "Edge-enhanced image zooming", Optical Engineering, vol. 35, No. 7, pp. 1862–70, SPIE Proc. European Signal Processing Conference, Grenoble, France, pp. 1445–8, July 1996.

[7] F. Michaud, C. T. Le Dinh and G. Lachiver, "Fuzzy Detection of Edge-Direction for Video Line Doubling", IEEE Transactions on Circuits and Systems for Video Technology, vol. 7, No. 3, pp. 539–42, June 1997.

SUMMARY OF THE INVENTION

Specific embodiments of the present invention address a number of problems associated with prior art systems. According to various specific embodiments, the present invention:

(1) provides a simple method that can up-scale an image in various scale ratios, including fractional scaling ratio, and can yield a sharp image with reduced unpleasant visual artifacts. The invention yields much better results compared with simple prior art methods and with some high complexity prior art methods.

(2) uses a power weight function that is gradient dependent and uses a function that has a linear dependence on the distance. A prior art solution, such as [3], instead develops a second correction phase that requires much higher complexity. In addition, [3] and some other known methods are not suitable for fractional scaling ratios.

(3) uses a power in the weight function that can be adapted according to the local contrast of edges to treat differently the high contrast edges and the low contrast edges.

A further understanding of the invention can be had from the detailed discussion of specific embodiments below. For purposes of clarity, this discussion refers to devices, methods, and concepts in terms of specific examples. However, the method of the present invention may operate with a wide variety of types of digital devices. It is therefore intended that the invention not be limited except as provided in the attached claims.

Furthermore, it is well known in the art that logic systems can include a wide variety of different components and different functions in a modular fashion. Different embodiments of a system can include different mixtures of elements and functions and may group various functions as parts of various elements. For purposes of clarity, the invention is described in terms of systems that include many different innovative components and innovative combinations of components. No inference should be taken to limit the invention to combinations containing all of the innovative components listed in any illustrative embodiment in the specification, and the invention should not be limited except as provided in the embodiments described in the attached claims.

All publications, patents, and patent applications cited herein are hereby incorporated by reference in their entirety for all purposes.

The invention will be better understood with reference to the following drawings and detailed description.

BRIEF DESCRIPTION OF THE DRAWINGS

FIG. 7 is a diagram of a computing device according to an embodiment of the invention.

FIG. 8 is a diagram of a representative IC according to an embodiment of the invention.

FIG. 9 is a diagram of a representative image capture device according to an embodiment of the invention.

FIG. 10 is a diagram of a representative image display device according to an embodiment of the invention.

DESCRIPTION OF SPECIFIC EMBODIMENTS

Image Interpolation

The present invention provides a novel method for interpolation having the capability of magnifying an image by various scale ratios including fractional scaling ratio. In one embodiment, any scale ratio may be used.

Interpolation according to the invention uses local gradient properties as in [3], but avoids the need for a second or correction phase and is suitable for both integer and fractional scale ratios and gives good visual results, even on sharply curved edges. The processing complexity is low compared to other proposed solutions.

Figure 1:
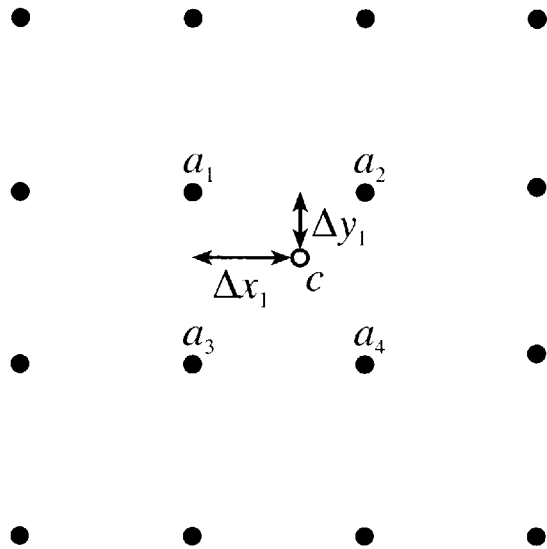
FIG. 1 is a diagram showing a typical situation for pixel interpolation.

FIG. 1 shows a typical case of interpolation. Denote the gray-level (or luminance) value of an original image pixel $a_i$ by $p(a_i)$ and denote the distance between original pixels horizontally and vertically as 1. The required calculated pixel in the upscale image is c. Its horizontal distance from pixel $a_i$ is denoted as $\Delta x_i$ and its vertical distance from pixel $a_i$ is denoted as $\Delta y_i$. The distances $\Delta x_i$ and $\Delta y_i$ can be calculated as center-point distances between calculated pixel c and original pixel $a_i$ or the distances can be calculated in any other way as known in the art or developed that is appropriate for a pixel shape and arrangement.

Calculating an Interpolated Pixel

According to one embodiment of the invention, the value of calculated pixel c is evaluated from its surrounding pixels, as shown in FIG. 1, according to an expression of the following general form:

$$p(c) = \frac{D(a_1)G'(a_1)p(a_1) + D(a_2)G'(a_2)p(a_2) + D(a_3)G'(a_3)p(a_3) + D(a_4)G'(a_4)p(a_4)}{D(a_1)G'(a_1) + D(a_2)G'(a_2) + D(a_3)G'(a_3) + D(a_4)G'(a_4)} \text{ Or} \quad (1)$$

$$p(c) = \frac{\sum_{i=1 \text{ to } l} D(a_i)G'(a_i)p(a_i)}{\sum_{i=1 \text{ to } l} D(a_i)G'(a_i)} \quad (1A)$$

Where l indicates the number of surrounding original pixels that are used to compute the interpolated pixel. For simplicity, the following equations will generally be given in a form where four surrounding pixels are used to calculate an interpolated pixel, but it should be understood that a greater or fewer number of surrounding pixels may be used.

$D(a_i)$ is a distance-based value. In one embodiment, $D(a_i)$ is linearly dependent on the distance and has the general form:

$$D(a_i) = (1-\Delta x_i)(1-\Delta y_i) \quad (2)$$

Gradient Power Function $G'(a_i)$ is a gradient power function according to the invention that incorporates the local gradient and in one embodiment has the form:

$$G'(a_i) = (-\mu G(a_i)+1)^n \quad (3)$$

In this expression (3) above, $G(a_i)$ represents the local gradient at pixel $a_i$. Many different methods for determining a local gradient are known in the art and may be used with the invention. An example of one method for calculating $G(a_i)$ is given below. In the present discussion $G(a_i)$ may be understood to be a value between 0 and 1 that is positively correlated with a local gradient.

$\mu$ is a positive value close to and less than 1. This value is selected so that the value $G'(a_i)$ will be close to zero when the gradient is close to one (a maximum gradient) and be close to one when the gradient is close to zero (a minimum gradient). One recommended value for typical images is $\mu=0.99$, but values for $\mu$ in the range of about 0.8 to about 0.99 will produce satisfactory results.

Calculating Local Gradients $G(a_i)$ in the gradient power function above denotes a value indicating a local gradient at $a_i$. Many techniques for calculating a local gradient are known and can be used in the function above according to the invention.

As an example, in a specific embodiment of the invention, a Sobel-type operator can be used to calculate $G(a_i)$. According to this embodiment, for each original point $a_i$, an average gradient of that point $G(a_i)$ is calculated by $$G(a_i) = \frac{|f_x'(a_i)| + |f_y'(a_i)|}{2} \quad (4)$$

Where $f_x'(a_i)$ and $f_y'(a_i)$ are the normalized (i.e. adjusted by a normalization factor) horizontal and vertical gradients that are calculated using a Sobel operator. The Sobel mask is given by $$\begin{bmatrix} -1 & 0 & 1 \\ -2 & 0 & 2 \\ -1 & 0 & 1 \end{bmatrix} \quad (5)$$

for horizontal (x) gradient and the transposed mask is used for vertical (y) gradient, as is known in the art. Thus, as is known in the art, $f_x'(a_i)$ is the sum of the three pixels to the left and the three pixels to the right of $a_i$, each multiplied by its Sobel coefficient; $f_y'(a_i)$ is the sum of the three pixels above and below $a_i$, each multiplied by its transposed Sobel coefficient. In this embodiment, these sums are then divided by a normalization factor. In a 0–255 gray level picture, the normalization factor, which is the maximum result from the Sobel operator, equals to 4*255 or 1,020. As a result, $G(a_i)$ is always in the range (0,1) and in this example higher values for $G(a_i)$ indicate a larger gradient.

Power Exponent

Figure 2:
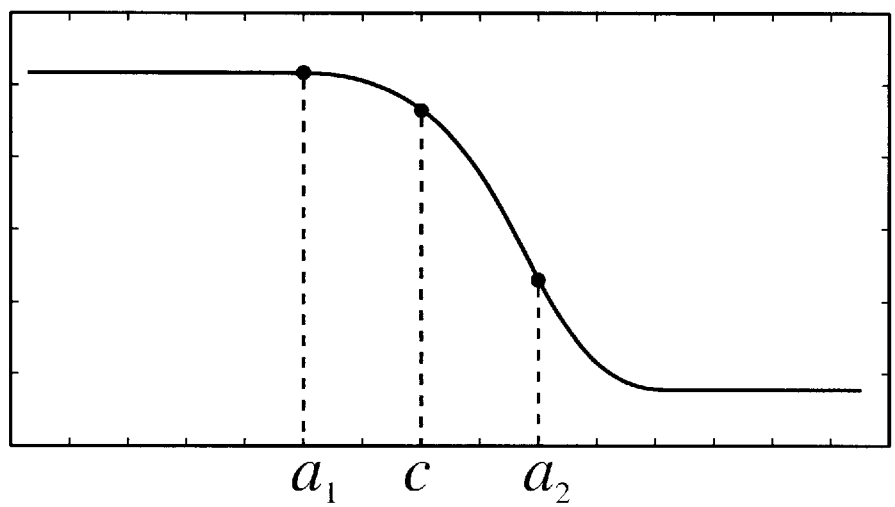
FIG. 2 is a diagram indicating pixel interpolation between two original points where there is a difference in gradient between original pixels.

The exponent n is a positive value generally between about 2 and 50 that is used as the power in an adjusted gradient function. To further understand the operation of the weight and distance functions, consider FIG. 2. FIG. 2 illustrates two original points, $a_1$ and $a_2$, where the gradient at $a_1$ is low and the gradient at $a_2$ is high. Next consider a point c, of approximately equal distance from $a_1$ and $a_2$. As can be seen from FIG. 2, according to the invention it is desirable that the missing value of c be set closer to the value of $a_1$ than of $a_2$. Therefore, according to the invention, a gradient function $G'(a_i)$ should provide a higher weight to the point with the lower gradient.

For this purpose, Ting et al. proposed a weight function that was Guassian-like. However, as discussed above, this function does not operate well on sharply curved edges and does not work on fractional scaling ratio.

Figure 3A:
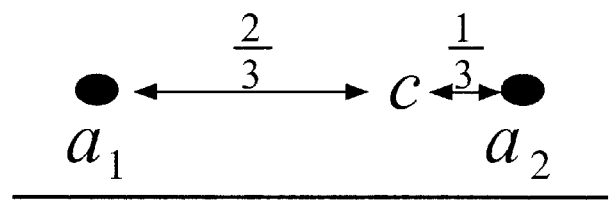
FIG. 3A is a diagram indicating interpolation of point c from original points $a_1$ and $a_2$.
Figure 3B:
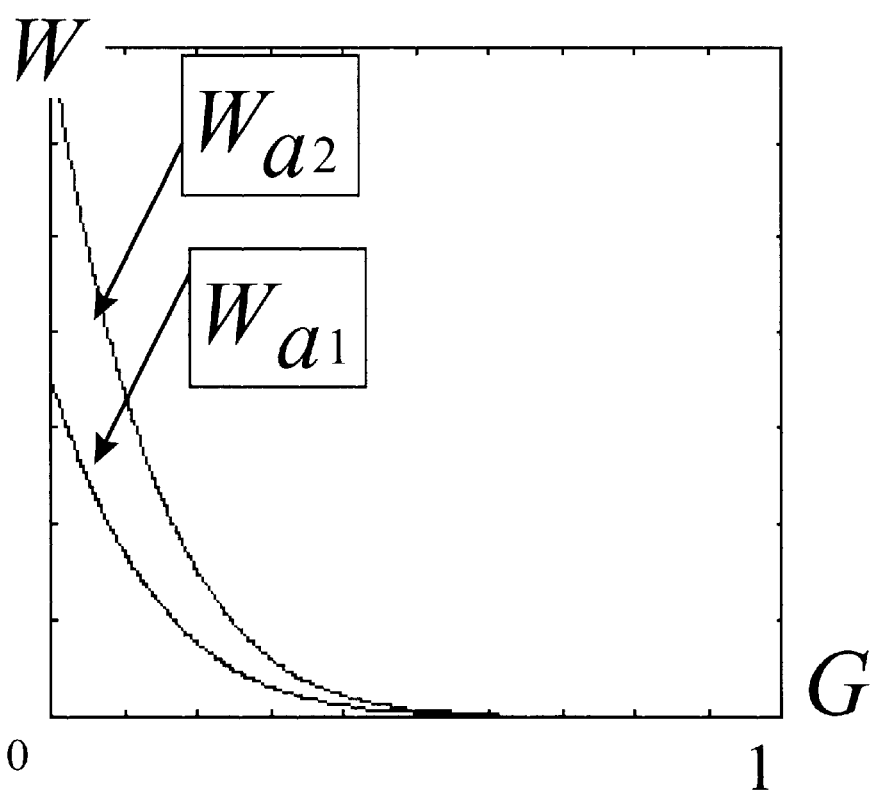
FIG. 3B is a graph indicating the values of a weight function versus pixel gradient according to an embodiment of the invention.

The function $G'(a_i)$ according to an embodiment of the invention as discussed above includes a power function component. In one embodiment, the function operates as in the graph shown in FIG. 3B for an interpolated point c from original points $a_1$ and $a_2$ having various gradient values as indicated in the figure and when the distance associated with $a_1$ is ⅔ and the distance associated with $a_2$ is ⅓. In FIG. 3B, G is the average gradient and W is the weight, which in one embodiment of the invention is the gradient times the distance value (G'*D). According to the invention, W will be higher as the gradient gets lower. As can be seen from the Figure, it is possible that the weight accorded to $a_1$ will be higher than that accorded to $a_2$, even though $a_2$ is closer to c. This can happen when the gradient at $a_1$ is lower than the gradient at $a_2$.

Note that the values of W in the range of G=0.6 to 1 are much different from the values of W in the range of G=0 to 0.6, but the shape of the graph is similar. In the case where G1=0.8 and G2=0.9 then W1/(W1+W2) and W2/(W1+W2) will have different values and will not be zero as might be concluded from the graph. In image interpolation according to this embodiment of the invention, the gradient value of an individual original point is not by itself determinative of the contribution of that original pixel to the interpolated pixel value. Instead, it is the relative differences between the gradients of points that are participating in the interpolation.

The Need For An Adaptive Power Function

In one embodiment of the invention, a single value of n is selected for interpolating an image. In an image where the contrast level of the edges is more or less uniform, a single value for n can be selected according to the invention to give acceptable results. A value of n=7 provides good results for high-quality images, whereas higher values of n would be optimal for lower quality images. Higher values of n are better when an image has a large number of low-contrast edges (in other words when edges in an image are defined by points with relatively lower gradients) and lower values of n are better when an image has a large number of high-contrast edges (in other words when edges in an image are defined by points with relatively higher gradients). High n's cause sharper edges in the upscaled image, while low values cause smother edges. High values of n can cause unpleasant artifacts for high contrast edges, while low values of n make low contrast edges appear too blurred.

However, when differently contrast edges (i.e. with different gradients on different edges (i.e images where the gradients of the edges in the image are considerably different) are present in an image, a single value of n proves non-optimal, as can be illustrated from the following two examples. In each example, assume it is desired to interpolate a point that is in the middle between $a_1$ and $a_2$. Further, assume a constant power n=7 and $\mu$=0.99. Given these assumptions:

If $G(a_1)$=0.3 and $G(a_2)$=0.5, then $W(a_1)/(W(a_1)+W(a_2))$=0.91 and $W(a_2)/(W(a_1)+W(a_2))$=0.08. (4B)

,while

If $G(a_1)$=0.04 and $G(a_2)$=0.07, then $W(a_1)/(W(a_1)+W(a_2))$=0.55 and $W(a_2)/(W(a_1)+W(a_2))$=0.45. (4B)

Note that while the ratio between $G(a_2)$ and $G(a_1)$ is nearly equal in both of the cases, the ratio between the weight factors in the first case is very different from the ratio between the weight factors in the second case.

In the first case, indicating a high contrast edge, a constant value of n=7 will provide interpolation that is close to pixel replication, with the original point with the lower gradient ($a_1$) having 91% of the contribution to c.

In the second case, indicating a low contrast edge, a constant value of n=7 will provide interpolation that is close to linear interpolation, with $a_1$ having 55% and $a_2$ having 45% of the contribution to c.

However, for superior gradient-based interpolation, the ratio between the weights in both cases should be smaller. It would therefore be desirable to have a lower power n in the first case, and a higher power n in the second case.

Adaptive Interpolation

According to alternative embodiments, the present invention addresses the issue just described by making n a positive value that can change adaptively according to local gradients. According to an embodiment of the invention, n may be adapted at each interpolated pixel. For example, in a good quality image with varying edge contrast, an n of 3 would produce better results with high contrast edges, and an n of 30 would produce better results with low contrast edges. According to one embodiment, the invention uses a novel operator based on local gradients to chose a higher n for low contrast edges and lower n for high contrast edges.

As a specific example of an implementation of this embodiment, set base_n to a minimum acceptable n and (base_n/α) to a maximum acceptable n. For most images, a minimum n would be about 3 and a maximum n would be about 30; α would therefore be 0.1. Images with very well-defined high-contrast edges, such as computer generated graphical images, might benefit from lower values of n, with a minimum n closer to 2. Images with lower-contrast edges, such as video images, might benefit from higher minimum and maximum values of n, such as 3.5 to 35.

According to an embodiment of the invention using gradient values from four surrounding pixels, the value of n for a particular interpolated pixel c is determined by:

$$n = \frac{\text{base\_n}}{\max(G(a_1), G(a_2), G(a_3), G(a_4), \alpha)} \quad (5)$$

Or, if a different number of surrounding gradients is used $$n = \frac{\text{base\_n}}{\max(G(a_1), \ldots, G(a_k), \alpha)} \quad (5A)$$

This value of n is then used to calculate the weight function of the surrounding pixels of c.

According to this embodiment of the invention, the weight function $W(a_i)$, which is dependent on a local gradient, is also modified by surrounding local gradients and the value of α such that pixels located on differently contrasting edges will be affected differently by their local gradients.

Figure 4:
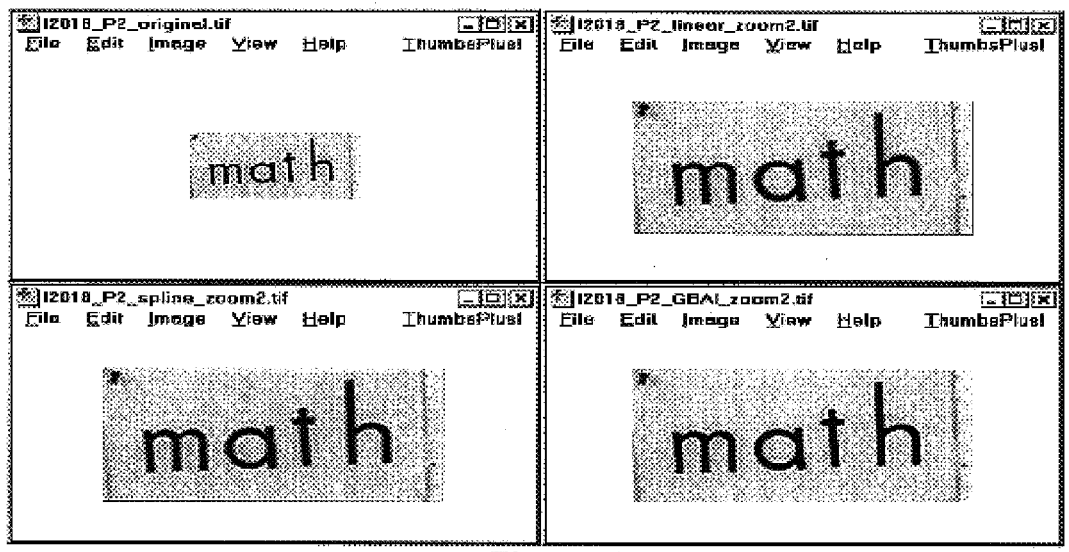
FIGS. 4-6 show examples of various images decoded using prior art methods and using gradient based interpolation according to the invention.
Figure 5:
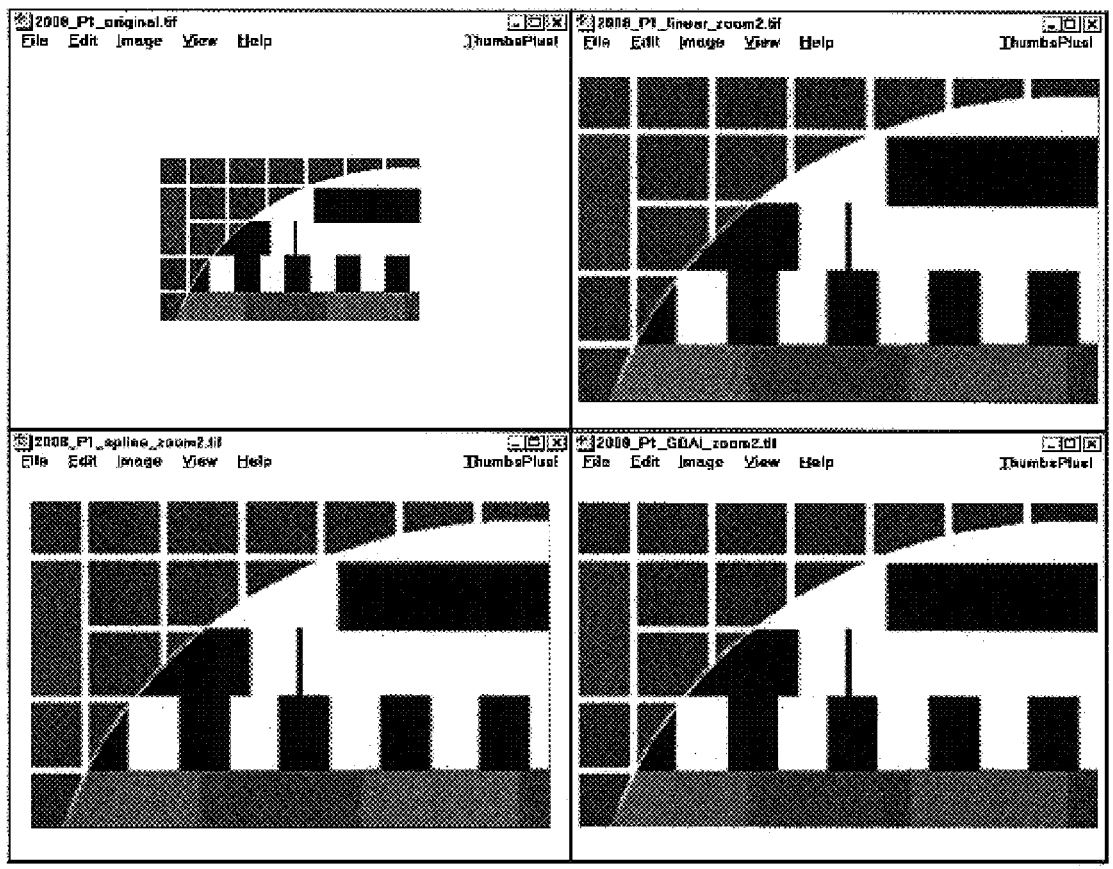
Figure 6:
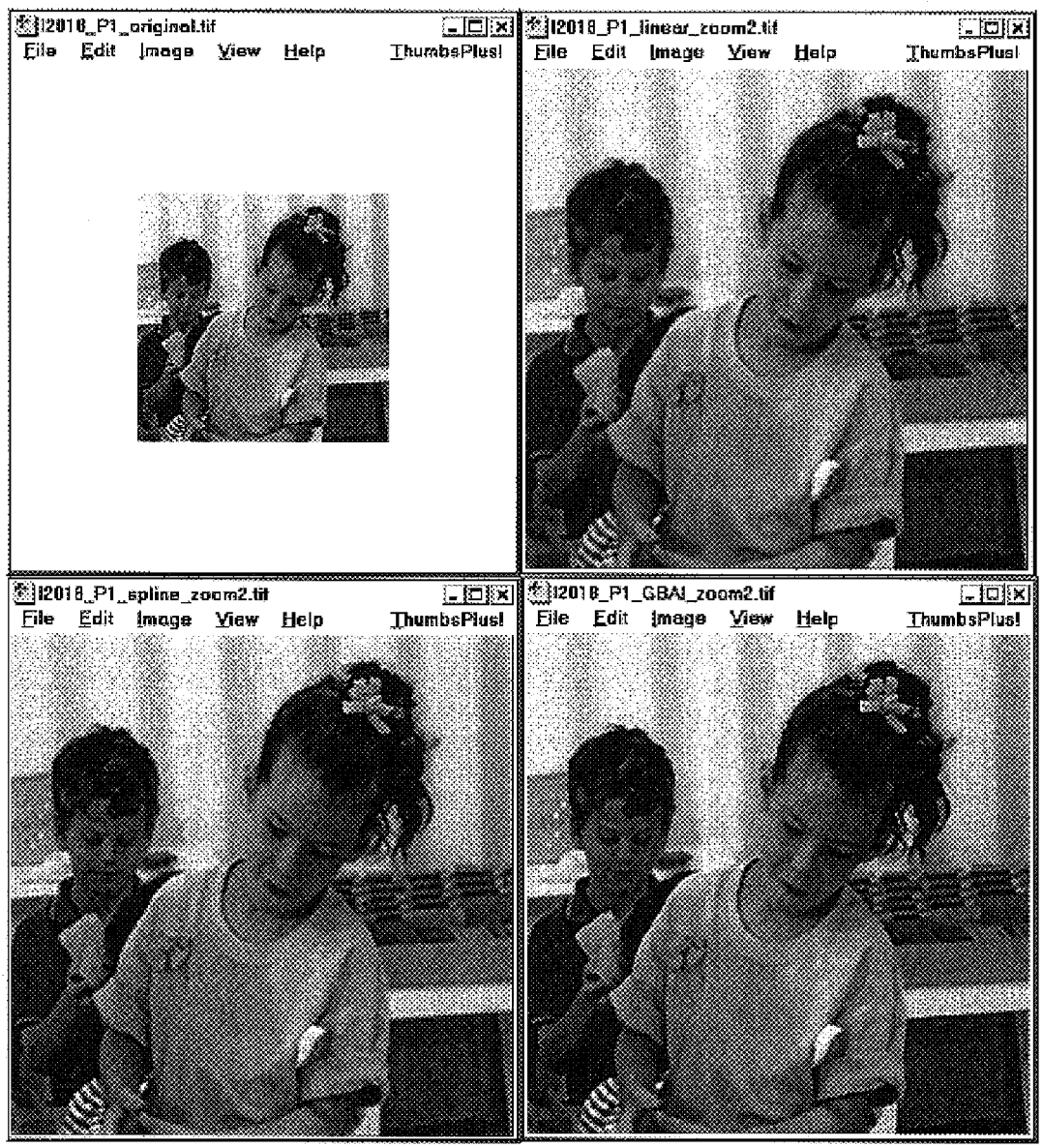

A comparison of this method result versus other methods is presented in example FIGS. 4, 5, and 6. In interpolation according to the invention, the edges in the magnified image are sharp yet lack jaggedness, as in the original image. The interpolating method according to the invention can be used for many different scaling ratios, yielding a far better visual quality of the magnified image compared to conventional methods.

Interpolation of Color Images

A number of variations and adaptations are possible within the scope of the present invention.

In one embodiment, the invention may be adapted to interpolate multi-spectral images such as color images. In one instance of this embodiment, just one of three values used for full-color images is used to determine the weight function $W(a_i)$ and gradients. Once weight function coefficients are calculated for an interpolated pixel c in a single color value, the same weight coefficients are used to determine interpolations of each color component of c. This method performs very well when color is encoded in a way that segregates the luminance signal from the color signals, such as Y-U-V or Y-I-Q or H-S-V. In such encoding, the luminance signal carries the most important gradient information and is used to determine the gradients and the weight function.

A method according to the invention can also be adapted to R-G-B images by either translating the RGB values to YUV or other encoding with a luminance component or by using the green (G) component to calculate weights and gradients. As is known, in human visual perception the G spectrum signal carries more of the luminance information.

Interpolation for Mosaic Images

A method according to the invention can also be used for decoding color mosaic filter patterned images, such as the well known Bayer pattern, which is based on a mosaic cell of the form:

| | |
|---|---|
| G | R |
| B | G |

As is known in the art, one step in a standard decoding of the Bayer pattern is interpolation of missing green pixel values. According to the current invention, this interpolation of green pixels may be accomplished using any of the embodiments herein described. After a fully-populated green plane is derived from improved interpolation according to the invention, R and B decoding can proceed as known in the art.

In another embodiment adapted to a mosaic pattern interpolation, the interpolating of the G values is done as previously described except from the calculation of the gradient value $G(a_i)$. This embodiment may be understood from the following example:

| | | |
|---|---|---|
| $R_1$ | $G_2$ | $R_3$ |
| $G_4$ | $B_5$ | $G_6$ |
| $R_7$ | $G_8$ | $R_9$ |

According to this embodiment, to find the G value in the place of $B_5$. (refer to this missing value as $G_i$) In this embodiment, the value of $G_i$ will be determined using $G_2$, $G_4$, $G_6$, and $G_8$ original pixel values, as described above but with an exception that the gradients value of $G_2$, $G_4$, $G_6$, and $G_8$ is calculated as in the following expressions:

$$G(G_4) = \frac{|f'_x(G_4)| + |f'_x(B_5)|}{2}$$

$$G(G_6) = \frac{|f'_x(G_6)| + |f'_x(B_5)|}{2}$$

$$G(G_2) = \frac{|f'_y(G_2)| + |f'_y(B_5)|}{2}$$

$$G(G_8) = \frac{|f'_y(G_8)| + |f'_y(B_5)|}{2}$$

Where $f'_x$ and $f'_y$ are calculated by horizontal or vertical Sobel operator. Note that distance values are equal for all participating pixels. The interpolation can be done using a constant power (usually around 20) or adaptive power. In this embodiment, this is done differently because of the properties of the Bayer pattern. Using the regular gradient value calculation will cause un-pleasant effects on edges.

It should be understood that the present invention is not limited to any of the particular gradient functions described herein. Any combinations of the local gradients can be used as the value for the $G(a_i)$ function.

In other types of image encoding, such as encoding of x-ray images or infrared images, similar adaptations to the interpolation method may be made.

Low Complexity Constant Power Function Implementation

When it is desired to use the constant power definition of the Gradient Based Adaptive Interpolation there is a low complexity method according to one embodiment of the invention with no difference in the visual results. When the algorithm is implemented in software, this method reduces considerably the computation time. When the algorithm is implemented in hardware, this method simplifies the hardware implementation. In both implementations, this method requires additional memory, in a specific example about ½ Kbyte. A specific example of a method according to this embodiment is described below.

The example method uses two Look Up Tables, herein denoted as LUT1 and LUT2. The size of each one of the tables is 256×16 bits and their values are set before the beginning of the scaling process. With the following definitions:

X—8 bit address value.

LUTi(X)—16 bit unsigned integer in address X of LUTi.

LUTi_high(X)—high byte unsigned integer in address X of LUTi.

LUTi_low(X)—low byte unsigned integer in address X of LUTi.

For address X in LUT1 table the following expression will be true:
$(-\mu X*2^{-8}+1)^n*2^8 = $LUT1_high$(X)*2^{-LUT1\_low(X)}$, where n is the constant power that was selected for the scaling (according to the known "nature" of the given images in the system) and can be in the range [0,100]. $\mu$ is equal to 0.99.

For address X in LUT2 table the following expression will be true:

$$\frac{1}{X} = LUT2(X)*2^{-16}$$

When using these two Look Up Tables, the calculations described ate can be made much more simple. After calculating the $G(a_i)$ value (by the sobel definition, for example), $G'(a_i)$ will be given by reading address (G/8) in LUT1, instead of multiplying, adding, and raising the expression by the power n. The division of the scaling algorithm (equations (1) or (1A)) is done by using LUT2.

If adaptive power is required only LUT2 can be used benefiting with a higher computation time than in the implementation of the constant power but still a lower computation time than dividing without using LUT2.

Embodiments in Digital Devices

The invention may be embodied in a fixed media or transmissible program component containing logic instructions and/or data that when loaded into an appropriately configured computing device cause that device to perform interpolation according to the invention.

FIG. 7 shows digital device 700 that may be understood as a logical apparatus that can read instructions from media 717 and/or network port 719. Apparatus 700 can thereafter use those instructions to direct a method of image interpolation. One type of logical apparatus that may embody the invention is a computer system as illustrated in 700, containing CPU 707, optional input devices 709 and 711, disk drives 715 and optional monitor 705. Fixed media 717 may be used to program such a system and could represent a disk-type optical or magnetic media or a memory. Communication port 719 may also be used to program such a system and could represent any type of communication connection.

The invention also may be embodied within the circuitry of an integrated circuit (IC), such as an application specific integrated circuit (ASIC) or a programmable logic device (PLD), a representation of which is shown in FIG. 8. One type of IC that may incorporate is versions of Zoran, Inc.'s COACH™ (Camera An A Chip) IC. The invention may also be embodied in a computer understandable descriptor language that may be used to create an ASIC or PLD that operates as herein described.

The invention also may be embodied within the circuitry or logic processes of other digital apparatus, such as cameras, digital displays, televisions, image editing equipment, etc. Two such apparatus are shown in FIG. 9 (a digital camera) and FIG. 10 (a television or display) that optionally may have either a built-in or an attached video play back device, such as a DVD player 610. This embodiment may also include a control 611, with a zoom control input.

In the case of a camera or other digital capturing devices, such as scanners, the invention may be used to increase the resolution of a captured image, by interpolating missing pixels.

The invention may also be embodied in a CCD capture device using a mosaic color filtered CCD, as generally described in U.S. Pat. No. 5,541,653, entitled METHOD AND APPARATUS FOR INCREASING RESOLUTION OF DIGITAL COLOR IMAGES USING CORRELATED DECODING, and issued Jul. 30, 1996. According to various embodiments, the invention may be used to interpolate missing pixel values in such a CCD device or may be used to increase the pixel resolution of the captured image, as discussed in 5,541,653.

A capture device such as shown in FIG. 9 includes physical image capture sensors, as known in the art, for capturing an image at a first pixel density. The physical size, number, and layout of the sensors will generally determine a native physical pixel capture density. According to the invention, a capture device includes image storage for holding a portion of a captured image (or all of said captured) while interpolated pixels are calculated. As can be seen from above, storage of a few lines of original pixels will allow for interpolation of missing pixels. The device further includes logic components for increasing pixel density by determining interpolated pixel values according to the invention and a interface for outputting an image at pixel density higher than the physical density of the sensors. This higher-density output can then be displayed or further edited by devices that do not incorporate the invention.

In the case of a television or display device, the invention may allow for improved display of an image that is transmitted or stored at a lower pixel density. A display device such as shown in FIG. 10 includes an interface such as a television receiver, computer network connection, or mass storage reader, for receiving an image at a first pixel density. According to the invention, a display device includes image storage for holding a portion of a received image (or all of the image) while interpolated pixels are calculated. As can be seen from above, storage of a few lines of original pixels will allow for interpolation of missing pixels. The device further includes logic components for increasing pixel density by determining interpolated pixel values according to the invention and a display for display an image at pixel density higher than the density of the received image.

The invention can also be embodied in a digital camera and therein used to interpolate the missing R, G and B values in the Bayer pattern or other mosaic pattern in a digital camera containing a CCD.

The invention can also be embodied in a DVD player, where the invention can be used for zooming and for aspect ratio conversions.

Other Embodiments

It will be apparent to those of skill in the art that many various embodiments are possible according to the invention.

It will be apparent that many values computed in the course of interpolating a pixel are reused in other steps of the calculation or in interpolating other values. A variety of optimizations in the method are possible that take advantage of these relationships to reduce the total number of computations needed.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A method for determining an interpolated pixel value comprising:

determining a plurality of gradient values for a plurality of original pixels near said interpolated pixel;

determining a plurality of distance values for a plurality of original pixels near said interpolated pixel;

combining a plurality of original pixel values, at least some of said original pixel values adjusted by said gradient values and said distance values; and normalizing the result of said combining to produce a value of said interpolated pixel.

2. The method of claim 1 wherein said gradient value is incorporated into a power function prior to said combining.

3. The method of claim 2 wherein said power function is adaptive according to local contrast of edges.

4. The method of claim 1 wherein said distance value has a linear dependence on the distance between said pixel and surrounding prior pixels.

5. The method of claim 1 wherein said gradient values are computed using a Sobel operation.

6. The method of claim 1 wherein said gradient values are computed using a Prewitt operation.

7. The method of claim 1 wherein said gradient values are computed using a Roberts operation.

8. The method of claim 1 wherein said method is performed by an appropriately configured digital processing device.

9. A method carried out by electronic circuitry for determining a pixel value p(c) of calculated pixel c from the values $p(a_i)$ of surrounding original pixels $a_{i(1 \text{ to } n)}$ according to an equation of the form:

$$p(c) = \frac{\sum_{i=1 \text{to} l} W(a_i) p(a_i)}{\sum_{i=1 \text{to} l} W(a_i)}$$

where $W(a_i)$ is a function with linear dependence on the distance and dependent on a local gradient, wherein the calculation according to said equation is performed by the electronic circuitry.

10. The method of claim 9 where l=4.

11. The method of claim 9 where $W(a_i)=D(a_i)G'(a_i)$.

12. The method of claim 11 wherein $D(a_i)$ is given by an expression of the form: $D(a_i)=(1-\Delta x_i)(1-\Delta y_i)$.

13. The method of claim 11 wherein $G'(a_i)$ is given by an expression of the form: $G'(a_i)=(-\mu G(a_i)+1)^n$.

14. The method of claim 13 wherein $G(a_i)$ is a gradient value computing from a plurality of surrounding pixels.

15. The method of claim 13 wherein $G(a_i)$ is a gradient value computing using a convolution kernel from a plurality of surrounding original pixels.

16. The method of claim 13 wherein $G(a_i)$ is a gradient value computing using a Sobel operator.

17. The method of claim 13 wherein $G(a_i)$ is a gradient value computing using a Prewitt operator.

18. The method of claim 13 wherein $G(a_i)$ is a gradient value computing using a Roberts operator.

19. The method of claim 13 wherein $\mu$ is a positive constant value close to and lower than 1.

20. The method of claim 13 wherein n is a constant value selected for a particular image.

21. The method of claim 13 wherein n is selected based on the average gradients of edges in said image.

22. The method of claim 13 wherein n is a value that is selected for a pixel based on the local contrast at said pixel.

23. The method of claim 22 wherein n is a value that is selected for a pixel based on the local contrast at said pixel according to the formula:

$$n = \frac{\text{base\_n}}{\max(G(a_1), \ldots, G(a_k))(\alpha)}$$

24. The method of claim 23 wherein k=4.

25. The method of claim 23 wherein $\alpha$ is a constant between 0 and 1 and is chosen so that base_n/Alpha is the maximum power and where base_n is a minimum power chosen so that the power fits the highest edge contrast that can be in the image.

26. The method of claim 23 wherein said method is performed by an appropriately configured digital processing device.

27. A method for determining a pixel value for an interpolating pixel in an image comprising:
determining a first sum of a plurality of values of a plurality of surrounding pixels, said plurality of values modified by at least two weighting factors;
dividing said first sum by a second sum, said second sum comprising said weighting factors wherein one of said weighting factors is a power weight function that is gradient dependent; and
developing an electronic image signal which incorporates the interpolated image pixel value therein.

28. The method of claim 27 wherein one of said weighting factors has a linear dependence on the distance.

29. The method of claim 27 wherein one of said weighting factors is a power weight function that is adaptive according to the local contrast of edges.

30. A digital image capture device comprising:
image capture sensors for capturing an image at a first pixel density;
image storage for holding a portion up to all of said captured image;
logic components for increasing pixel density and determining the value of an interpolated pixel by:
determining a plurality of gradient values for a plurality of original pixels near said interpolated pixel;
determining a plurality of distance values for a plurality of original pixels near said interpolated pixel; and combining a plurality of original pixel values, at least some of said original pixel values adjusted by said gradient values and said distance values to produce a value of said interpolated pixel; and
an interface for outputting said image at a second pixel density.

31. An image display device capable of displaying an image with an altered pixel density comprising:
an interface for accepting an image at a first pixel density;
image storage for holding a portion of said image up to all of said image;
logic components for increasing pixel density and determining the value of an interpolated pixel by:
determining a plurality of gradient values for a plurality of original pixels near said interpolated pixel;
determining a plurality of distance values for a plurality of original pixels near said interpolated pixel; and
combining a plurality of original pixel values, at least some of said original pixel values adjusted by said gradient values and said distance values to produce a value of said interpolated pixel; and
a display for displaying said image at a second pixel density.

32. The device according to claim 30, wherein the interface for outputting said image causes the second pixel density of said image to be increased.

33. The device according to claim 31, wherein the interface for outputting said image causes the second pixel density of said image to be increased.

34. The method of claim 1, additionally comprising adding the value of the interpolated pixel to values of the original pixels, thereby to increase the number of values of pixels.

35. A method of determining a value of a given pixel of an image from values of pixels surrounding the given pixel, comprising:
summing values of a plurality of said surrounding pixels to determine the value of the given pixel of the image, the summed values being modified by a power weighting function that is adaptive to characteristics of the image, and
developing an electronic video signal for displaying the given pixel with the determined value.

\* \* \* \* \*

UNITED STATES PATENT AND TRADEMARK OFFICE
CERTIFICATE OF CORRECTION

PATENT NO. : 6,832,009 B1
DATED : December 14, 2004
INVENTOR(S) : Shezaf et al.

Page 1 of 1

It is certified that error appears in the above-identified patent and that said Letters Patent is hereby corrected as shown below:

<u>Column 10,</u>
Line 49, replace the word "ate" with the word -- above --.

Signed and Sealed this

Twenty-sixth Day of July, 2005

JON W. DUDAS
*Director of the United States Patent and Trademark Office*